June 9, 1964     R. W. TRIPP     3,136,218
THERMAL COMPENSATION
Filed Sept. 26, 1955     4 Sheets-Sheet 1
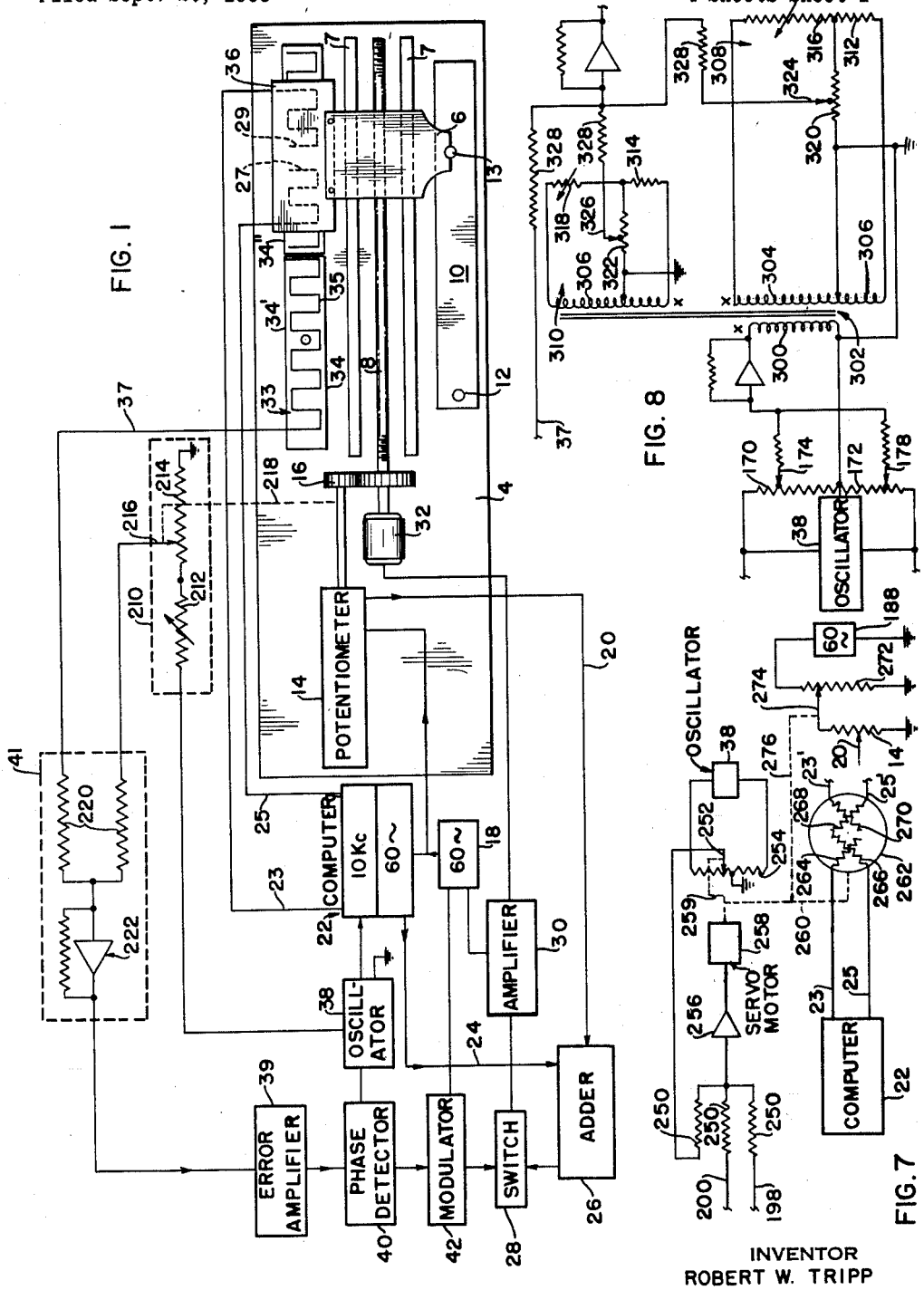
INVENTOR
ROBERT W. TRIPP
BY
ATTORNEYS June 9, 1964   R. W. TRIPP   3,136,218
THERMAL COMPENSATION
Filed Sept. 26, 1955   4 Sheets-Sheet 2
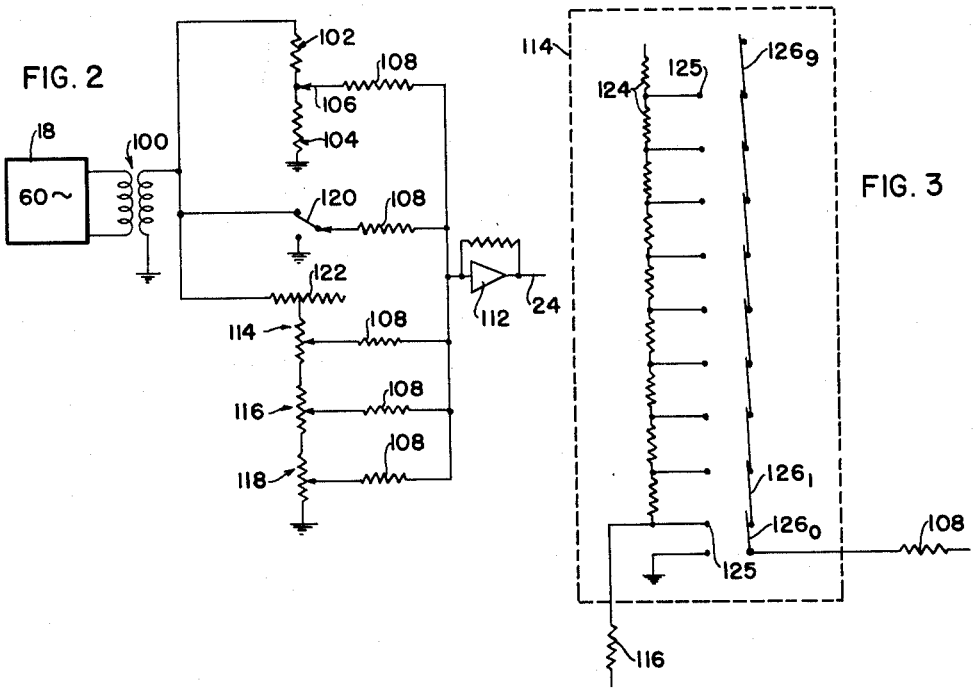
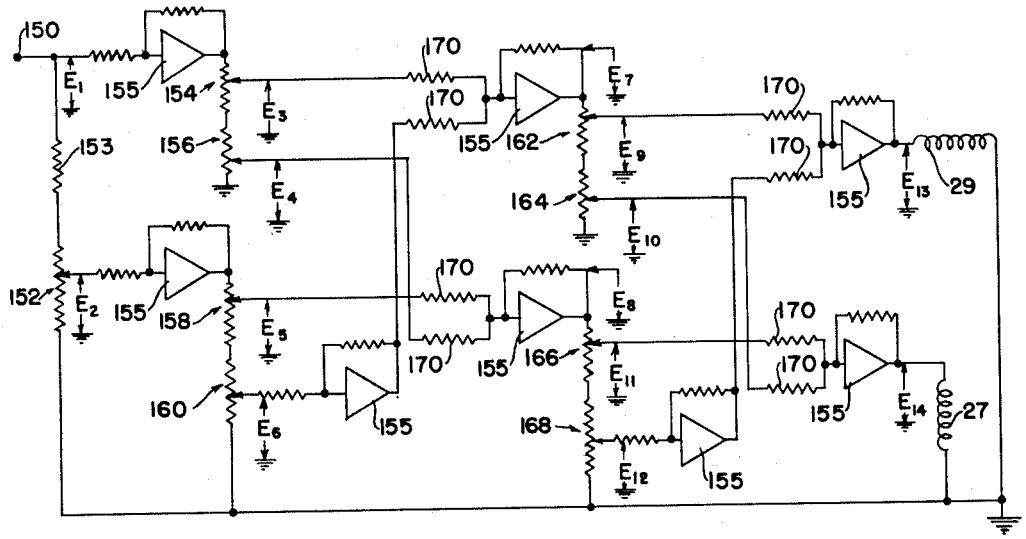
INVENTOR
ROBERT W. TRIPP
BY
ATTORNEYS

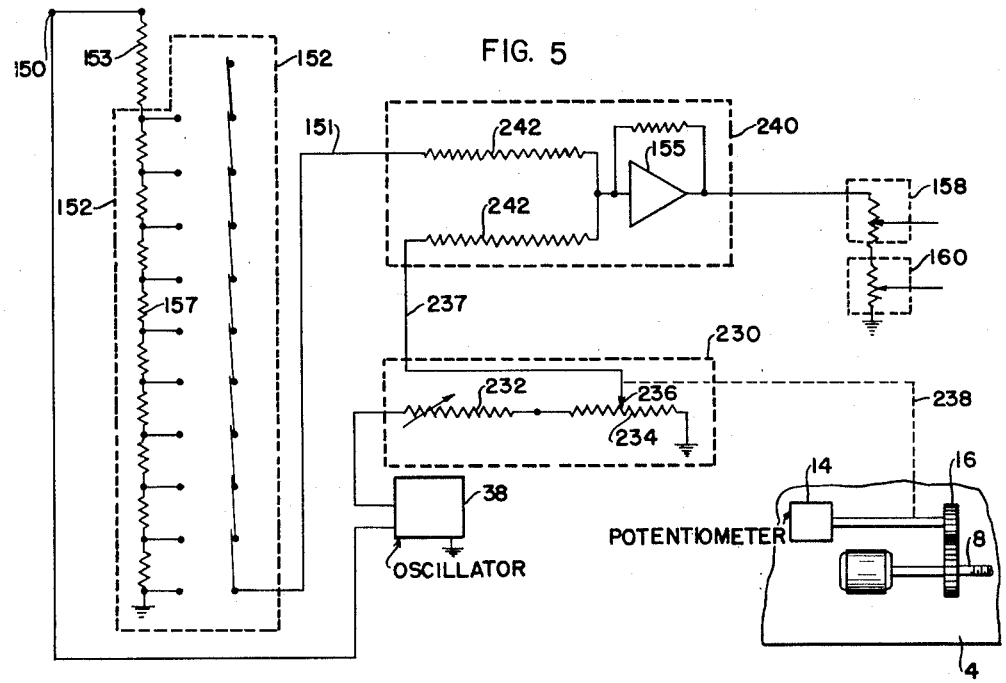
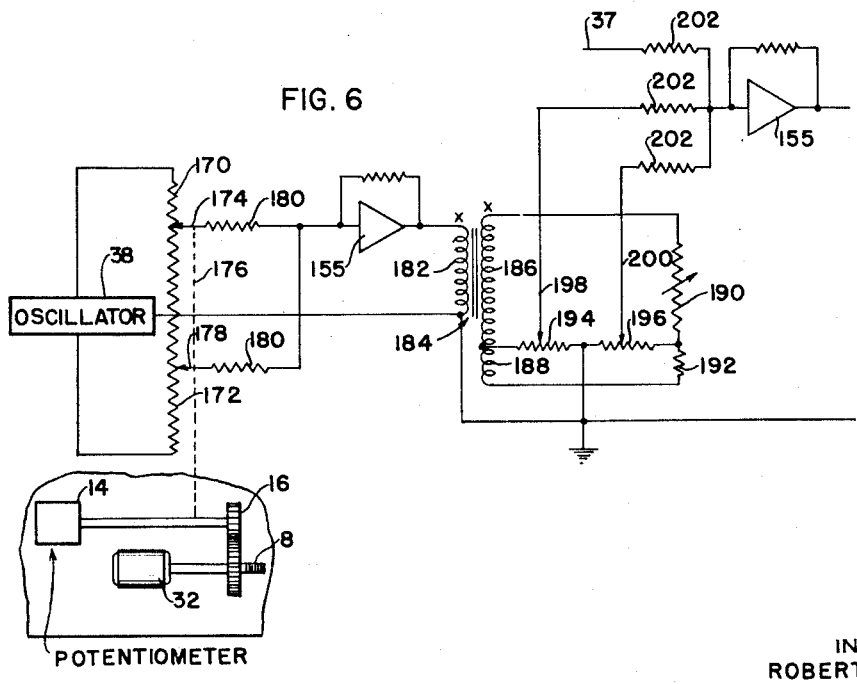

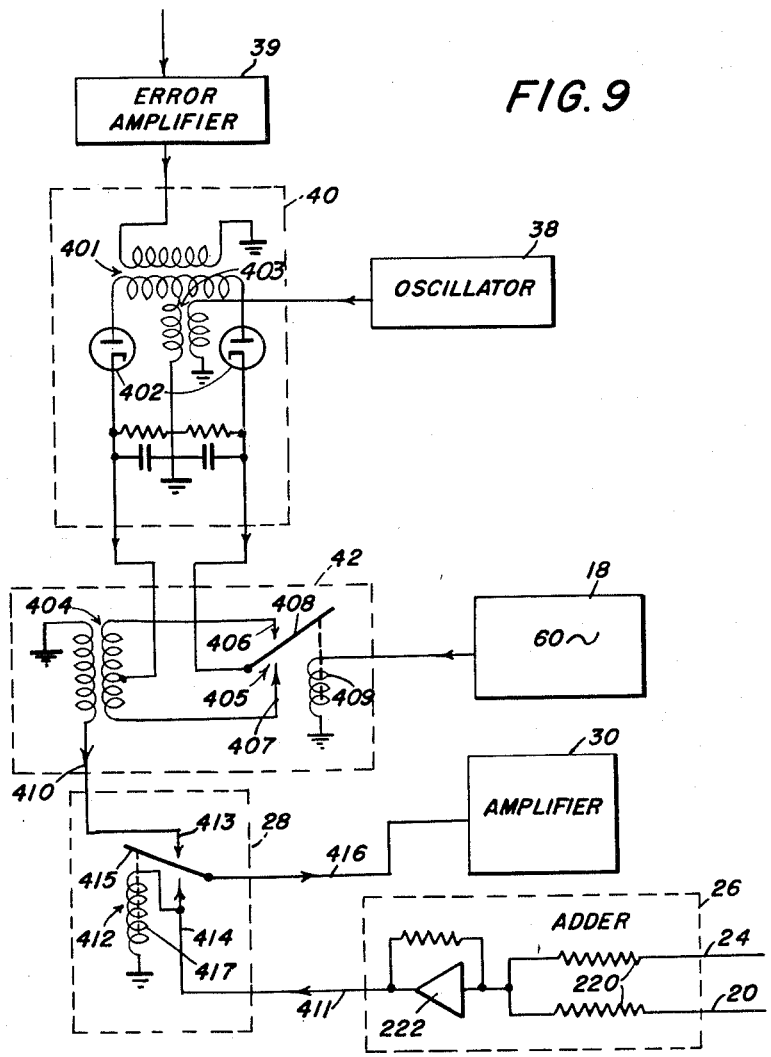

United States Patent Office 3,136,218
Patented June 9, 1964

3,136,218
THERMAL COMPENSATION
Robert W. Tripp, Bronxville, N.Y., assignor, by mesne assignments, to Inductosyn Corporation, Carson City, Nev., a corporation of Nevada
Filed Sept. 26, 1955, Ser. No. 536,465
17 Claims. (Cl. 90—16)

This invention relates to machine tool control, and more particularly to control over the drive of a cutting tool with respect to a workpiece in order to compensate, in the positioning of the cutting tool with respect to the workpiece, for thermal expansion and contraction of the workpiece and of the machine tool itself.

In one class of machine tools a workpiece is supported on a stationary frame or bed in known position with respect to a coordinate system defined for the frame, and a cutting tool is caused to engage the workpiece at locations which are specified by commands given to the positioning mechanism which drives the cutting tool to a position or succession of positions defined in that coordinate system. The workpiece however expands and contracts. Accordingly if it is machined at a temperature other than that of its intended use, it will be cut to the wrong dimensions. Moreover the frame of the machine tool itself expands and contracts, carrying with it in general the physical elements of the coordinate system by which the cutting tool is guided. Consequently if the machining operation is carried out at a temperature other than that at which the coordinate system was laid down, the workpiece will be cut to the wrong dimensions by virtue of thermal expansion of the machine tool itself, independently of thermal expansion of the workpiece.

The invention provides a method and means whereby thermal errors of these types may be compensated for. The invention is equally applicable to other types of machine tool in which the cutting tool (e.g. the bearings of a rotating cutter) is fixed in the frame or bed and in which the workpiece is fastened to a carriage which is advanced with respect to the position of the cutter. The invention finds particular application in the control of machine tools in which the position of the cutting tool (or alternatively of a table supporting the workpiece) is specified as to fine increments of distance by means of position measuring transformers of the general type disclosed in application Serial No. 509,168 assigned to the assignee hereof, now U.S. Patent No. 2,799,835. The invention will be described in terms of its application to machine tools of this type although it is not restricted thereto.

The invention will now be described with reference to the accompanying drawings in which:

FIG. 1 is a schematic representation of one embodiment of the invention;

FIG. 2 is a simplified schematic diagram of the coarse position command signal generating apparatus of the system of FIG. 1;

FIG. 3 is a schematic diagram in detail of one portion of the apparatus of FIG. 2;

FIG. 4 is a simplified schematic diagram of the fine position command signal generating apparatus of the system of FIG. 1;

FIG. 5 is a schematic diagram of a portion of the apparatus of FIG. 4, showing in conjunction therewith the thermal compensation apparatus of FIG. 1 but with a different arrangement for utilization of the thermal compensation signal produced thereby;

FIG. 6 is a schematic diagram of another embodiment of the invention;

FIG. 7 is a diagram of auxiliary apparatus usable in conjunction with the elements of thermal compensation apparatus illustrated in FIGS. 1 and 6 when large thermal errors are to be compensated for;

FIG. 8 is a schematic diagram of still another embodiment of the invention; and

FIG. 9 is a schematic diagram of one form of apparatus suitable for use in the phase detector, modulator, switch and adder devices 40, 42, 28 and 26 of FIG. 1, with interconnections thereof as in that figure.

In FIG. 1 there is shown a machine tool including a bed 4 lengthwise of which a carriage 6 moves on ways 7 under control of a lead screw 8. A workpiece 10 is supported on the bed 4, fastened thereto at one portion thereof as by means of dowels 12. The carriage supports a cutting tool 13, for example a miller, by means of which chips are to be removed from the workpiece. For positioning of the carriage lengthwise of the bed 4 the machine includes both coarse and fine position data systems. These data systems develop command signals which together define desired locations for the carriage, and in the embodiment illustrated a servosystem is provided which automatically drives the carriage to the locations so defined. The coarse position data system includes a helical potentiometer 14 coupled by means of gearing 16 to the lead screw. The potentiometer is energized from a voltage source 18, which may for example be an ordinary 60-cycle lighting source, and the voltage instantaneously tapped from the potentiometer 14 at its slider, appearing at a line 20, is a fraction of the voltage applied from source 18 proportional to the position of the carriage 6 lengthwise of limits of travel established for it on the machine. Command signals representative in both coarse and fine terms of a desired position or program of successive positions for the carriage may be developed in a program unit or computer generally indicated at 22. For the coarse command a 60-cycle voltage, cophasal with that applied to the potentiometer by the source 18, is delivered by unit 22 at an output line 24. A comparison unit 26 adds the computed coarse position command voltage to that tapped from the potentiometer 14, and the difference is applied through a switching circuit 28 to a servo amplifier 30 which drives a motor 32 coupled to the lead screw 8. The switching circuit 28 functions to transfer control from the coarse to the fine position components of the system when the carriage is located at a position differing from the desired position measuring by no more than one-half a cycle of the position transformer for fine position determination yet to be described.

The position measuring transformer generally indicated at 33 may be of the type disclosed in copending application Serial No. 509,168. It includes a continuous winding member 34 fastened to the machine bed 4 and a quadrature winding member 36 affixed to the carriage 6. As disclosed in that application the windings of the two members lie in separate planes, and the members are supported on the bed and carriage to position the windings of the two members parallel to each other at a constant small separation. If the permitted travel of the carriage is large (and it may be of the order of many feet) the member 34 may be made up of a plurality of members as 34' and 34'', pinned or otherwise fastened to the bed 4 and electrically connected together to provide effectively a continuous winding. On member 34 a continuous multipolar hairpin winding 35 establishes a position cycle for the fine position determining system. The winding 35 includes a large number of uniformly spaced series-connected conductors extending transversely of the direction of relative motion of the members 34 and 36 and the spacing center to center of three adjacent conductors constitutes one space cycle or one "pole cycle" of the transformer. Magnetic fields of successively alternate polarity are, at any time instant, associated with successive conductors when the winding is energized with an A.C. voltage. These conductors are seen to be disposed in an array extending parallel to the ways 7.

The quadrature winding member 36 includes two windings 27 and 29 each generally similar to the winding of member 34 but in space quadrature of that cycle with respect to each other. The transformer is so constructed that upon energization of either of the windings 27 or 29 with an A.C. voltage, the amplitude of the voltage induced in the winding 35 will vary substantially sinusoidally with the position of member 36 lengthwise of member 34, the induced voltage going through one cycle of amplitudes for a change in relative positions of the members equal to one pole cycle of the member 34.

For accurate indication of the position of the carriage the computer unit 22 develops, for an oscillator 38 which may operate at a frequency of the order of 10 kc., two in-phase A.C. voltages of amplitudes related to each other as the sine and cosine of the phase in the pole cycle of the winding of member 34 to which the carriage is to be moved, plus or minus a quarter of a cycle in view of the fact that the system is driven to a null instead of to a maximum of voltage induced from member 36 into member 34. The particular pole cycle to which the space phase is to apply is selected by the coarse positioning apparatus already described. With the carriage so positioned to within one half of a pole cycle of the position defined by the sum of the coarse and fine position command signals developed in computer 22, the voltage induced in the winding 35 of member 34 by the quadrature windings 27 and 29 of member 36 is an error voltage representative of the departure of the carriage from the location desired for it. The polarity or 180° phase of this error voltage with respect to the voltage of the same frequency in oscillator 38 indicates the sign of the departure, i.e., whether the carriage is short of the destined position or beyond it. The error voltage of the transformer, taken therefrom at a line 37, is amplified in an error amplifier 39 and compared in phase with the voltage from oscillator 38 in a phase detector 40. In FIG. 1 the error signal is indicated as passing through a combining network shown within a dash line box 41. This pertains particularly to the temperature compensation of the invention, and will be described in detail presently after a general description of the machine tool positioning system, to thermal compensation of which the invention is shown as applied in FIG. 1.

The output of the phase detector 40, which may be of conventional type, is a D.C. voltage varying in amplitude and sign according to the magnitude and sign of the error in position of the carriage. This voltage may be employed by conventional servo methods to drive the motor 32 in the direction required to reduce the error in carriage position to zero. Thus for example the D.C. output of the phase detector 40 may be employed to modulate a power line frequency into one or the opposite polarity at a modulator device 42 whose output passes through the switch 28 for subsequent application to the motor 32 via an amplifier 30. Components 26, 28, 40 and 42 will now be further described by reference to FIG. 9.

In FIG. 9 the amplified error voltage produced by the amplifier 39 is applied to a transformer 401 in phase detector 40. The transformer is shown with one end of its primary winding grounded for consistency with the convention being followed of a common ground for the circuits of FIG. 1 except where the contrary is indicated.

The ends of the secondary winding of transformer 401 connect to the plates of diode detector tubes 402 whose cathodes lead into the modulator circuit 42.

The 10 kilocycle reference signal for phase detection is applied from oscillator 38 to a transformer 403 in the phase detector. Again, one end of the primary of this transformer is shown grounded and the secondary is connected between ground and the mid-point of the secondary of transformer 401. Resistance capacity filtering networks are connected between the cathodes of tubes 402 and ground.

With the circuit of FIG. 9 as thus far described, the cathode of one or the other of tubes 402 will be positive with respect to ground while the other is negative, according to the phase of the error voltage applied to amplifier 39 with respect to the 10 kilocycle signal originating in oscillator 38. This direct current voltage difference is employed in the modulator 42 to develop a 60 cycle voltage in one or the other phase with reference to the 60 cycle reference voltage of the source 18, for control via amplifier 30 of the motor 32 in order to shift the position of the carriage in the direction required to reduce the amplitude of the error signal applied to amplifier 39.

In modulator 42 the cathode of one tube 402 is connected to the mid-tap of the primary winding of a transformer 404 and the cathode of the other tube 402 is connected to the movable magnetic armature 408 of a vibrator generally indicated at 405. This vibrator has two stationary contacts 406 and 407 connected respectively to the ends of the primary of transformer 404. The armature 408 of the vibrator is caused to engage the fixed contacts cyclically at a 60 cycle rate by the field developed in a coil 409 across which is applied the reference 60 cycle voltage of source 18.

The secondary winding of transformer 404 is grounded at one end and a conductor 410 leads from the other end thereof into the switch 28. Conductor 410 therefore carries a 60 cycle voltage whose phase with reference to the voltage of source 18 is representative of the sign of the net fine error in the carriage position, i.e., of the difference between the error signal developed in the transformer 33 and the signal developed on tap 216 of potentiometer 214 for compensation of the difference in thermal expansion coefficients of the workpiece 10 and machine bed 4.

The adder 26 is a device similar to the adder 41 except that its components are selected to handle signals of 60 cycles per second instead of 10 kilocycles. One input on conductor 24 is the 60 cycle voltage from computer 22 representative of desired coarse position for the carriage. The other input to adder 26, on conductor 20, is the 60 cycle output signal from potentiometer 14 representative of the instantaneous actual coarse carriage position for the carriage. These two inputs are added algebraically in summing resistors 220 and the difference between the two is sent through an amplifier 222 for impedance matching purposes to produce on a conductor 411 a 60 cycle voltage whose amplitude is representative of the amount of the instantaneous discrepancy between desired carriage position, in coarse terms, applied to conductor 24 and the instantaneous actual carriage position, in coarse terms, applied to conductor 20. The phase of the voltage on conductor 411, with reference to the 60 cycle voltage of source 18, represents the sign or direction of that discrepancy.

The switching circuit 28 comprises simply a relay generally indicated at 412, having fixed contacts 413 and 414 respectively connected to conductors 410 and 411, and a movable magnetic armature contact 415 which connects, via a conductor 416 with the input to amplifier 30 of FIG. 1. The relay 412 is actuated by a coil 417, one end of which is grounded and the other end of which is connected to conductor 411. The armature is spring biased to contact conductor 410 so that the coarse error signal on conductor 411 is applied to amplifier 30 only when it exceeds a specified level determined by the properties of the relay. When the value of the coarse error signal declines below this level the switching circuit transfers the input of amplifier 30 from adder 26 to modulator 42 so that thereafter the signal employed for energization of motor 32 is representative of the error of the carriage in fine rather than coarse terms.

With apparatus of this kind in which the pole cycle of the continuous winding 35 on member 34 is one tenth of an inch there have been obtained reproducible accuracies in the positioning of the carriage of the order of .0001 inch. The accuracy of measurement of carriage position and hence the accuracy in the dimension to which the workpiece on the machine may be cut is limited primarily by the thermal expansion of the bed 4 of the machine and of the workpiece itself. FIG. 1 is an embodiment of the invention providing for compensation of thermal errors small in comparison to one pole cycle of the position measurement transformer. According to the embodiment of FIG. 1, the relative position of the transformer members of apparent zero error signal is, for any pair of values of the input voltages to member 36, changed by the amount of the thermal error to be compensated for by adding to the error signal developed by winding 35 a properly proportioned cophasal signal of opposite polarity. Such a signal of opposite polarity may be termed a bias signal and will if properly proportioned serve to compensate for thermal error in the position of the carriage, as defined by the input signals to member 36, when such error is due to difference between the thermal expansion coefficients of the workpiece and bed and to a design temperature for the workpiece and bed (including transformer member 34) other than the ambient. It may be here observed that the difference between the thermally produced change in the position of points along the machine bed and of points along the continuous winding 35 may be made small, for example by selecting for the insulating material of which the member 34 is made a material having the same expansion coefficient as the bed 4 of the machine.

The bias voltage is generated in FIG. 1 in a compensating network enclosed within a dash line box 210, and the bias voltage there generated is combined with the error voltage output of the transformer in a network enclosed within a dash line box 41. In box 210 an adjustable resistor 212 is connected in series with a potentiometer 214 across a suitably proportioned reference 10 kc. voltage produced by oscillator 38. The tap 216 on potentiometer 214 is mechanically coupled to the carriage drive by means of a linkage diagrammatically indicated at 218 so as to be adjacent the grounded end of the potentiometer when the carriage positions the cutter 13 opposite the dowel 12. The linkage is arranged so that as the cutter moves to the right (in FIG. 1) from the location of dowel 12, tap 216 moves to points of higher voltage on the potentiometer.

The resistor 212 is adjusted in value in accordance with the difference between the thermal expansion coefficients of the workpiece and machine (e.g., in FIG. 1, bed 4) and in accordance with the difference between the ambient temperature and that at which the workpiece is to have the dimensions programmed for it, which should also be the temperature at which the calibration of the coordinate system of positions along the machine bed in terms of the pole cycles of member 34 will be correct. By ambient temperature here is meant the temperature of the bed 4, transformer 33 and workpiece. Also, reference to calibration of the member 34 is to be understood as including the positioning of the portions 34' and 34" thereof, whether one or more, lengthwise of the bed from a zero reference in terms of which coarse and fine position data are related to each other.

Resistor 212, which is manually set prior to operation of the automatic machine illustrated in FIG. 1, is to be varied inversely with these two differences, since the compensation signal should have zero value if the ambient temperature is the same as the design temperature, i.e. that at which the member 34 was calibrated and at which the workpiece is to be accurate, and also if the workpiece and machine have the same thermal expansion coefficients, regardless whether the ambient and design temperatures are the same or not. In the first case of course the material of the workpiece is dimensionally correct for its intended use and will accordingly be cut correctly, assuming correct calibration of the member 34. In the case of equal thermal coefficients, the workpiece will at the ambient temperature be cut to dimensions which are in error by just the amount representing the change which the workpiece will undergo in returning to the design temperature.

If, however, the ambient temperature departs from the design temperature and if the workpiece and bed have different coefficients, thermal compensation is necessary if the workpiece cut at the ambient temperature, is to have the correct dimensions at the temperature of its intended use. The magnitude of the error to be compensated is also clearly proportional to the distance between the doweling point 12 and the instantaneous position of cutter 13, since it is the differential expansion of this much of the workpiece and bed only which contributes to the thermally produced positional error of the cutting tool with respect to the workpiece which must be compensated for.

In addition of course the absolute magnitude of the bias or thermal compensation voltage must be correctly chosen, by dimensioning of resistor 212 and potentiometer 214 with respect to the amplitude of the voltage taken from oscillator 38 for application to the two in series and with reference to the amplitude level of the error voltage at the point in the error channel between transformer 33 and phase detector 40 where the compensation and error signals are combined. Thus in order for the signal at the output end of the error channel to be zero, if in one case at a given carriage position the thermal error amounts to one-twentieth of a pole cycle, the voltage between tap 216 and ground must be equal in amplitude and opposite in polarity or time phase to the voltage appearing between conductor 37 and ground when the carriage 6 is one-twentieth of a pole cycle away from the zero position defined by the input signals to windings 27 and 29. Let it be assumed that the thermal error to be compensated for is positive, by which shall be meant that without compensation the workpiece will be cut oversize. This corresponds to the possible case of an ambient temperature higher than the design temperature and of an expansion coefficient for the bed greater than that of the workpiece. Then the sign and amplitude of the compensation voltage must be such that when the carriage is one-twentieth of a pole cycle short of the position defined by its input signals, the error signal will be equal in magnitude and opposite in polarity to the compensation signal. The actual selection of a polarity for the voltage applied by oscillator 38 across resistor 212 and potentiometer 214 thus depends not only on the polarity of the error signal in winding 35 representative of a long or short position of the carriage but also on the signs of the differences between the expansion coefficients of the workpiece and bed, and between the ambient and design temperatures. If desired a reversing switch can be provided in the unit 38 to permit selection of the two polarities at will.

The compensation voltage at tap 216 is combined with the error voltage in line 37 by means of a combining network indicated at the dash line box 41. This network includes equal summing resistors 220 and a summing or impedance matching amplifier generally indicated at 222. The voltage at the input to amplifier 222 is one-half the algebraic sum of the voltages applied to the resistors 220. The output of network 41 is applied to the error amplifier 39 for control of the lead screw drive motor 32 as previously described.

Compensation effected by addition into the error channel of a volatge opposite in polarity to the error signal will serve if the thermal error to be compensated for, i.e., the change in carriage position to be achieved in order to compensate for thermal error, is a small fraction of the pole cycle. This is true because the curve for the amplitude of the error voltage induced in winding 35 as a function of departure of the transformer members from the position defined by the input voltages to member 36 is sinusoidal and hence is approximately linear in the vicinity of its zero values. Hence for the compensation of errors amounting to a small fraction of a pole cycle bias voltages of amplitude similarly proportional to the thermal error may be added directly to the error voltage to produce an apparent zero error position in which the carriage will be correspondingly displaced from the position defined by the inputs to member 36.

When larger thermal errors are to be compensated for, the thermal compensation apparatus of FIG. 1 may be modified in accordance with FIG. 7. The correction of small errors may however be effected otherwise than in the embodiment of FIG. 1. Another embodiment of the invention will now be described with reference to FIGS. 2–5. In this embodiment a compensation signal of the same type as that which has been thus far disclosed is added to one of the two input command signals to the quadrature winding member 36, namely that which represents the sine of the space phase in the pole cycle of member 34 to which the carriage is to be driven. For an understanding of this embodiment of the invention there must be given some description of the generation of the fine position command signals which are applied to windings 27 and 29 of the quadrature member 36. For the sake of completeness a brief description will also be given of one form of apparatus for generation of the coarse position command signals.

In the system of FIG. 1 as has been generally stated hereinabove the computer 22 is a device which develops electrical signals representative of a desired position or succession of positions to which the machine tool carriage is to be moved, these signals for each such desired position including a signal representative of coarse increments in carriage travel and a signal representative of fine increments in carriage travel. One form of circuit for generating as part of computer 22, signals representative in coarse terms of desired carriage positions is illustrated in FIGS. 2 and 3. In FIG. 2 the source of alternating current 18 of FIG. 1 is indicated as energizing a step-down transformer 100. The secondary winding of the transformer 100 has one terminal grounded and the other terminal connected to two chains of series-connected resistors whose remote ends are grounded also. Plural voltages may be tapped at variable points along one of these chains for addition together while the other chain is provided as a zero setting device. By appropriate proportioning of the resistors in the first chain the voltages tapped therefrom may be made representative of the digits in the multi-digit number representative of a desired carriage position. These voltages when added together thus give a sum voltage which is representative in coarse terms of a desired carriage position. The sum voltage may be compared in the adding unit 26 of FIG. 1 with the voltage arriving from potentiometer 14 via line 20 for control of the servo mechanism which drives the carriage.

In particular, in FIG. 2 a voltage representative to a first approximation of a desired carriage position is generated by the summation through equal summing resistors 108 of three voltages tapped from three series-connected chains of resistors separately generally indicated at 114, 116 and 118. These chains of resistors are connected across the secondary of transformer 100 via a scale adjustment resistor 122 of low value. The sum output voltage so obtained may be passed through an impedance matching amplifier 112 for application to line 24 (FIG. 1).

One or another range of sum voltages corresponding for example to carriage positions on adjacent members 34′ and 34″ respectively (FIG. 1) may be selected at a switch 120 which either grounds an additional summing resistor 108 or connects it to the high potential end of the secondary of transformer 100. The winding of potentiometer 14 is also advantageously connected across the secondary of transformer 100, and assuming a connection of its tap such that high potentials thereon with respect to ground correspond to positions of the carriage remote from its starting point on the machine bed, switch 120 should be connected to ground for carriage positions at the start of carriage travel, i.e., to the left in FIG. 1. Resistors 102 and 104 across the transformer secondary provide at a fixed or movable tap 106 a zero adjustment voltage for addition via a further summing resistor to the sum voltage from chains 114, 116 and 118.

Of all the resistance in chains 114, 116 and 118 together, most is included in chain 114, and changes in the position of its tap alter by the coarsest increments the sum voltage applied to line 24. Variations in the position of the tap on chain 116 provide for intermediate increments while the tap on chain 118 provides for the finest increments in the coarse position command signal developed in the apparatus of FIGS. 2 and 3. The resistor chains 114, 116 and 118 are conveniently arranged in a decimal system with ten discrete taps or positions in each chain. Thus for a carriage travel of twenty inches, and assuming a pole cycle on transformer member 34 (FIG. 1) of 0.1 inch, switch 120 may be arranged to select between ranges of carriage position zero to ten and ten to twenty inches from the beginning end of carriage travel. Chain 114 then permits selection for addition to the voltage selected at switch 120 of a voltage increment corresponding to an integral number of inches from zero to nine. Chain 116 permits selection of a voltage increment corresponding to an integral number of tenths of inches from zero to nine, and chain 118 permits selection of a voltage increment corresponding to an integral number of hundredths of inches from zero to nine.

FIG. 3 illustrates how the chain 114 may be made up of nine equal resistors 124, the low potential end of each of which is led out to a switch contact 125. The associated summing resistor 108 may be connected to any of the contacts 125 by a series of switches $126_1$–$126_9$. In addition a switch $126_0$ nearest the summing resistor 108 permits connection of that resistor to ground if the desired carriage position to be set up in the computer 22 includes no integral inches. If it includes one inch, whether or not it includes tens and hundredths as well, switch $126_1$ is shifted to connect the summing resistor 108 to the contact 125 at the junction between chains 114 and 116, the total resistance from this junction to ground through chains 116 and 118 being equal in value to one of the resistors 124.

Chain 116 consists in similar fashion of nine resistors each having a value one-tenth that of each of the resistors 124, and chain 118 consists of ten resistors each having a value one-hundredth that of each of the resistors 124. Thus by the setting of three switches, one associated with each of the chains 114, 116 and 118, it is possible to apply to line 24 a voltage representing to the nearest one-hundredth of an inch a desired position for the carriage in FIG. 1. While in the embodiment of the invention described the pole cycle of the transformer 33 is assumed to be one tenth of an inch and while it has been stated that the coarse positioning system need drive the carriage only to within one-half a pole cycle of its intended position before control of the servosystem is transferred from the coarse to the fine apparatus, in fact for reliability it is desirable that the coarse position apparatus drive the carriage to within a smaller distance of the ultimate carriage location defined by the fine position command signals. For this reason FIG. 2 includes not only the chains 114 and 116 from which voltages representative of inches and tenths may be tapped but also a chain 118 from which voltages representative of hundredths may be tapped for addition to the sum voltage applied to line 24 as the coarse position command signal.

The schematic diagram of FIG. 4 illustrates in simplified form the portion of computer 22 which is devoted to development of fine position command voltages for energization of the quadrature windings 27 and 29 on member 36 in the position measurement transformer. It is to this portion of the computer that the thermal compensation voltage is applied in the embodiment of the invention illustrated in FIG. 5.

Like the apparatus of FIGS. 2 and 3, that of FIG. 4 is digital in nature, providing for the development of a plurality of sine voltages and a plurality of cosine voltages which differ by discrete amounts. In the case of FIG. 4 these discrete voltages are those representative of the sines and cosines of angles uniformly spaced over a 360° cycle, which cycle represents all possible space phases in the cyclical position relation of member 36 (FIG. 1) lengthwise of member 34. With a pole cycle of 0.1 inch the relation is of course cyclical in a shift of member 36 through 0.1 inch with respect to member 34.

For a positional accuracy of the carriage of 0.0001 inch the apparatus of FIG. 4 provides for the development of fine position command signals in the form of voltages representative of the sine and cosine of all integral multiples of 0.36°. This is done in three stages corresponding respectively to angular increments of 0.36°, 3.6° and 36°. In the first stage one switching network 152 similar to that shown in FIG. 3 is employed for this purpose. In the second stage four such switching networks 154, 156, 158 and 160 are employed and in the third stage four such networks 162, 164, 166 and 168 are provided. The 10 kc. voltage from oscillator 38 of FIG. 1 is applied between ground and a terminal 150. Network 152 and terminal 150 itself belong to the first stage and serve to develop respectively voltages proportional to the sine and cosine of the angle given by the product of 0.36° times the digit in the fourth decimal place of the desired carriage position. This product may be referred to as an angle $\phi_0$. Since the cosine of an angle whose maximum value is 9 times 0.36° is close to unity, the voltage between terminal 150 and ground is taken itself to be representative of the cosine of $\phi_0$ regardless of the value of the digit in the fourth decimal place. A dropping resistor 153 reduces to a small fraction of the voltage at terminal 150 the maximum voltage which may be selected at network 152 in view of the small maximum value of sin $\phi_0$.

Let the sinusoidal voltage between terminal 150 and ground be denoted E. The voltages $E_1 = E \cos \phi_0$ at that terminal and $E_2 = E \sin \phi_0$ taken from network 152 are passed through impedance matching amplifiers 155. E cos $\phi_0$ is then applied across the resistor chains of networks 154 and 156 in series, and E sin $\phi_0$ is applied across the resistor chains of networks 158 and 160 in series. Like network 152 and that of FIG. 3, networks 154, 156, 158 and 160 each include ten settings, corresponding to the ten possible values of the digit in the third decimal place of the desired carriage location. The resistance in the chains of networks 154 and 158 are so proportioned that the voltages tapped from those networks will be proportional to the cosine of the product of 3.6° times the value of the digit so set, this product angle being referred to as $\phi_1$. The resistors in the chains of networks 156 and 160 are so proportioned that the voltages tapped from those networks will be proportional to the sine of $\phi_1$. Ganged controls may be provided whereby, in terms of the reference character nomenclature of FIG. 3, switches of the same subscripts in all networks of each stage will be operated together, for example by means of a bank of push buttons including three sets of ten push buttons numbered from zero to nine for each of the fourth, third and second decimal places of the desired carriage location.

The voltage $E_3$ selected at network 154 will then be proportional to the cosine of $\phi_1$ and also to the cosine of $\phi_0$, or:

$$E_3 = E \cos \phi_0 \cos \phi_1$$

Similarly the voltage $E_4$ selected at network 156 is:

$$E_4 = E \cos \phi_0 \sin \phi_1$$

In similar fashion the voltages $E_5$ and $E_6$ taken from networks 158 and 160 are:

$$E_5 = E \sin \phi_1 \cos \phi_1$$

and $$E_6 = E \sin \phi_0 \sin \phi_1$$

$E_6$ is inverted in an amplifier 155. $E_3$ and $E_6$ are then combined at summing resistors 170 and passed through an impedance matching amplifier 155 for application as a voltage $E_7$ to the series-connected resistor chains of networks 162 and 164 in the third stage. $E_4$ and $E_5$ are similarly combined to form a voltage $E_8$ applied across the series-connected chains of resistors in networks 166 and 168. Thus $$E_7 = E_3 - E_6$$
$$= E \cos(\phi_0 + \phi_1)$$

and $$E_8 = E_4 + E_5$$
$$= E \sin(\phi_0 + \phi_1)$$

From the foregoing description it will be understood that networks 162, 164, 166 and 168, which are similar to networks 154, 156, 158 and 160, respectively develop voltages as follows:

$$E_9 = E_7 \cos \phi_2$$
$$E_{10} = E_7 \sin \phi_2$$
$$E_{11} = E_8 \cos \phi_2$$
$$E_{12} = E_8 \sin \phi_2$$

where $\phi_2$ is the angle given by the product of 36° and the value of the digit in the second decimal place of the intended carriage location, this digit being set in by a ganged control to the switches of networks 162, 164, 166 and 168.

$E_{12}$ is inverted in an amplifier 155 and added to $E_9$, and the sum is passed through a further impedance matching amplifier 155 to develop a voltage $E_{13}$ given by $$E_{13} = E_9 - E_{12}$$
$$= E \cos(\phi_0 + \phi_1 + \phi_2)$$

$E_{10}$ and $E_{11}$ are similarly added and passed through another amplifier 155 to produce a voltage $E_{14}$ given by $$E_{14} = E \sin(\phi_0 + \phi_1 + \phi_2)$$

Since the sum of angles $\phi_0 + \phi_1 + \phi_2$ is the pole cycle phase angle $\phi$ representing the fine increment in the desired carriage location, $E_{13}$ and $E_{14}$ are the fine position command voltages developed by computer 22. These voltages are applied respectively to windings 27 and 29 in the quadrature winding member 36 of the transformer 33, these windings being schematically indicated in FIG. 4.

The computing apparatus of unitt 22 in FIG. 1 may be located either adjacent or remote from the machine, and a single bank of push buttons or similar controls may be provided for setting up a desired carriage location in both coarse and fine terms, e.g., in terms of a six-digit number for a machine whose carriage has a travel of 99.9999 inches.

The description of FIGS. 2–4, like the remainder of that given herein, assumes for simplicity a common ground return in all circuits. Thus only one lead is shown for each of the transformer windings 27, 29 and 35, and only one lead is shown in the error channel and in the other channels interconnecting the various electrical elements in FIG. 1. Obviously however the invention is not limited to this arrangement.

With this description of one form of apparatus suitable for use in the computer 22 for the generation of fine position command signals, the embodiment of the invention illustrated in FIG. 5 may be understood. In FIG. 5 the network 152 of FIG. 4 is shown in schematic detail together with a network 230 similar to the network 210 of FIG. 1 and a combining network 240. In network 230 a variable resistor 232 and a potentiometer 234 are shown connected across an output voltage from the oscillator 38 of FIG. 1, this output voltage having the same frequency and the same or opposite phase as that applied between terminal 150 and ground in FIG. 4. While the voltage applied to network 230 might, according to the sign of the thermal error to be compensated for be of the same polarity or time phase as that applied between terminal 150 and ground, it may also have to be of the opposite polarity. Accordingly the source 38 is shown in FIG. 5 as having separate output connections to terminal 150 and to the network 230. As in the case of FIG. 1, a selector switch may be provided to make the 10 kc. reference voltage of oscillator 38 available in either polarity to network 230. In network 230 the tap 236 on potentiometer 234 is coupled by linkage 238 with gearing 16 and lead screw 8 of the machine tool in the same manner as previously described in connection with the embodiment of FIG. 1. The voltage from tap 236 is fed by a line 237 to network 240, where it is added in a pair of summing resistors 242 to the voltage $E_2 = E \sin \phi_0$ drawn at a line 151 from network 152. The sum voltage is passed through an impedance matching amplifier 155 before being sent on to networks 158 and 160.

The relative magnitudes of resistor 232 and potentiometer 234 are selected in accordance with criteria similar to those discussed in connection with the embodiment of FIG. 1. These magnitudes must be such, taking into account the amplitude of the voltage applied across these two elements in series, that addition in network 240 of the voltage tapped from potentiometer 234 to the voltage $E_2 = E \sin \phi_0$ will produce at the output of network 240 a corrected voltage $E_{2'} = E \sin \phi_{0'}$ wherin $\phi_{0'}$ is the angle representing the finest increment in a corrected phase angle $\phi'$. With a computer such as that of FIG. 4, this finest increment is a multiple of 0.36° between zero and nine. $\phi'$ itself is the phase angle in the pole cycle of transformer 33 representative of carriage position corrected for the thermal error to be corrected, i.e., that inherent in the difference between the thermal expansion coefficients of the workpiece and bed, in the difference between the ambient and design temperatures, and in the distance between the doweling point 12 and the carriage location.

The embodiment of FIG. 5, like that of FIG. 1, is limited to the compensation of thermal errors which are small by comparison with the pole cycle of transformer 33. Accordingly $\phi'$ differs from $\phi$ by a small angle, which is reflected in a change of the small angle $\phi_0$ to another small angle $\phi_{0'}$. For such small angles the sines vary approximately linearly with their angles, whereas the cosines remain approximately unity in value independent of the value of the angle, or more accurately stated, the percentage change in the values of the cosines remains negligibly small. It is for these reasons, by the way, that the individual resistors 157 of network 152 may all be of equal value, as is not the case for example with networks 162 to 168 which are provided for taking the sines and cosines of large angles.

Accordingly the potentiometer 234 of network 230 may be a linear potentiometer like the potentiometer 214 in the embodiment of FIG. 1, and a simple algebraic addition of voltages in network 240 is sufficient to produce at the output of that network a corrected voltage $E_{2'} = E \sin \phi_{0'}$. No correction need be made to the voltage $E_1$, so that $$E_1 = E_{1'}$$
$$= E$$

With a corrected signal $E_{2'}$, both of the fine position command signals $E_{13}$ and $E_{14}$ will be corrected, and the carriage will be driven in the first instance to a location differing by the amount of the thermal error from the location defined by the six push buttons punched in setting up the switching networks of FIGS. 2–4 for a desired workpiece dimension.

FIG. 6 illustrates still another embodiment of the invention. This embodiment has greater flexibility than those previously considered. In FIG. 6 a reference voltage from the oscillator 38, having the same frequency and the same or opposite phase as that applied by oscillator 38 to the phase detector 40 but an amplitude which may be independently selected, is applied across the terminals of a potentiometer 170 while the same voltage but in opposite polarity is applied across the terminals of a potentiometer 172 advantageously identical with potentiometer 170. The tap 174 on potentiometer 170 is coupled by a linkage 176 to the lead screw so as to draw from the potentiometer 170 a voltage proportional to the distance between the position of the carriage and the origin of measurement, assumed in the machine tool of FIG. 1 to be at the left end of carriage travel. The tap 178 on potentiometer 172 is adjusted manually to draw from that potentiometer a voltage proportional to the distance between the origin of measurement and the point of attachment of the work to the machine bed, the proportionality being such that if the carriage is opposite i.e., abreast of, the point of attachment the voltages at taps 174 and 178 will be equal and opposite.

Taps 174 and 178 connect to equal summing resistors 180 from whose junction a sum voltage is fed to an impedance matching amplifier 155. The output of this amplifier is connected across the primary winding 182 of a transformer generally indicated at 184. The secondary winding is tapped between its ends to form two portions identified at 186 and 188, across the remote ends of which are connected an adjustable resistor 190 and a temperature sensitive resistance 192 in series. A bridge circuit is formed by the connection of a series combination of potentiometers 194 and 196 between the junction of windings 186 and 188 and the junction of resistors 190 and 192.

The resistor 192 is a temperature sensitive resistance exposed to the same temperature as that of the machine and its workpiece. It may for example be a resistance wire mechanically fastened to the machine bed 4. Resistor 190 is an adjustable resistor which is set to the value which balances the bridge when resistor 192 is brought to the design temperature. As in the embodiments of FIGS. 1 and 5, design temperature here means the temperature at which the transformer 33 was calibrated in the spacing of the transverse conductors of its winding 35 and in the location of its portions 34' and 34" on the machine bed, this being also the temperature at which the workpiece will possess the dimensions intended for it. Resistor 190 is preferably much greater in value than resistor 192, and the turns ratio of the secondary winding portions 186 and 188 is preferably equal to the ratio of resistors 190 and 192. By making resistor 190 much greater than resistor 192 the change in voltage across the bridge diagonal is made a substantially linear function of changes in the resistance of resistor 192.

Potentiometers 194 and 196 in the diagonal of the bridge are preferably of the same total value, and may be calibrated in terms of the thermal expansion coefficients of the machine and workpiece. By proper choice of polarities in the voltages applied to potentiometers 170 and 172 and attention to phase changes for example in the transformer 184, one potentiometer, e.g., 194, may be identified with the coefficient of expansion of the workpiece while the other potentiometer 196 is identified with that of the machine. For a given machine the tap 200 on potentiometer 196 will be set once and locked, whereas the tap 198 on the potentiometer 194 may be made adjustable according to the material of the workpiece.

Taps 198 and 200 on potentiometers 194 and 196 are employed to extract from the bridge voltages of opposite sign representative respectively of the thermally induced errors of the workpiece and machine tool. These voltages are combined differentially with each other and with the error voltage from transformer 33 at three equal summing resistors 202, to the uppermost of which in FIG. 6 the voltage from winding 35 of transformer 33 in FIG. 1 is assumed to be applied via conductor 37. The difference voltage between taps 198 and 200 represents the thermal compensation voltage of the embodiment of FIG. 6, corresponding to the compensating voltage provided at tap 216 in the circuit 210 of FIG. 1. The sum voltage taken at the three resistors 202 may be passed through an impedance matching amplifier 155 and then passed on to the error amplifier 39 of FIG. 1 or otherwise employed to detect a net error in the carriage position.

Taps 198 and 200 are set on their potentiometers according to the coefficients of the workpiece and machine bed, potentiometers 194 and 196 being advantageously calibrated for this purpose. The bridge is set up by bringing resistor 192 to the design temperature of the machine, which as above stated sets the design temperature of the workpiece at an equal value. The primary winding 182 is then excited, and resistor 190 is adjusted until the bridge is in balance, whereupon resistor 190 may be locked in position by appropriate means. The calibration of potentiometers 194 and 196, for example in terms of inches per inch per degree, may be arbitrary but it should be the same for both. It must be such that, in conjunction with the gains and attenuations elsewhere in the circuit of FIG. 6 between the oscillator 38 and the inputs to the summing resistors 202, thermal compensation voltages between taps 198 and 200 of the correct absolute amplitude level will be obtained. The criterion here is the same as that previously discussed in connection with FIG. 1. Thus a given thermal error in linear measurement must produce a voltage of the same amplitude but of opposite sign as the error voltage (originating at transformer winding 35) which at the point of combination of the error and compensation voltages corresponds to the same linear displacement of transformer member 34 from the position defined for it by the fine position command signals applied to windings 27 and 29.

As illustrated in FIG. 6 with the compensation signal of the bridge circuit added directly to the error signal from winding 35, the embodiment of that figure is limited to the compensation of thermal errors small in comparison with the pole cycle of transformer 33 for the reasons set forth above in the description of the embodiment of FIG. 1. The embodiment of FIG. 6 has however the advantage over the embodiment of FIGS. 1 and 5 that with motion of the carriage lengthwise of its ways past the point of attachment of the workpiece to the bed, the embodiment of FIG. 6 will automatically reverse the polarity of the compensation signal as is required for carriage locations on opposite sides of the point of attachment. In the embodiment of FIG. 6, such opposite carriage locations correspond to opposite polarities of the difference between the voltages tapped from potentiometers 170 and 172, and hence to opposite polarities in the compensation voltage existing between taps 198 and 200. Carriage locations on opposite sides of the point of attachment require such compensation voltages of opposite polarity because of the opposite polarities of the error voltages from winding 35 of transformer 33 which will exist when, in such opposite locations, the carriage is moved to a location corrected for thermal error, even though the sign of the thermal error itself is the same in both cases. In addition, the embodiment of FIG. 6 permits direct calibration of separate potentiometers in terms of workpiece and machine expansion coefficients.

The embodiment of FIG. 6 may however be adapted by means of the apparatus illustrated in FIG. 7 to the compensation of thermal errors of the same order of magnitude as the pole cycle of the position measuring transformer with which it has been described as being used. In FIG. 7 taps 198 and 200, between which the thermal compensation signal of the circuit of FIG. 6 exists, are shown connected to two summing resistors 250. A third summing resistor 250 equal to the other two receives not the error voltage from the position measuring transformer but a voltage drawn at a tap 252 from a linear potentiometer 254 across which is applied a reference voltage cophasal with that of the oscillator 38 used for development of the fine position command signals and for detection of the sign of the error voltage (see FIG. 1). The sum voltage developed at the junction of the three resistors 250 is passed through an amplifier 256 whose output energizes a servo motor 258. Motor 258 is mechanically linked to tap 252 at a linkage 259. The motor thus drives the tap 252 until the voltage drawn by the latter from potentiometer 254 is equal in magnitude and opposite in phase to the algebraic sum of the voltages at taps 198 and 200, under which condition the net input voltage to amplifier 256 is zero.

In this manner there is obtained at motor 258 an angular shaft position which is proportional to the thermal compensation voltage, whatever the magnitude thereof. A linkage 260 couples motor 258 with the rotor of a resolver 262. This device includes two stator windings 264 and 266 in space quadrature and two rotor windings 268 and 270 also in space quadrature. The device is connected into the channels which transmit the fine position command signals from the computer 22 of FIG. 1 to the windings 27 and 29 of transformer 33, and the effect thereof is to rotate electrically the sine and cosine command voltages from unit 22 through an angle determined by the orientation of the rotor and stator members of the resolver. The leads 23 and 25 of FIG. 1 which connect computer 22 with windings 27 and 29 are shown in FIG. 7 as connected to one pair of quadrature windings 264 and 266 for input of the command signals to the resolver. Leads 23' and 25' connected to the other pair of quadrature windings 268 and 270 represent output channels to transformer windings 27 and 29. Resolvers having the high accuracy desired for use in the circuit of FIG. 7 are disclosed in the copending application Serial No. 536,464, filed September 26, 1955, now Patent No. 2,900,612, which is assigned to the assignee hereof. Linkage 260 is established to make the proportionality of resolver rotation to thermal compensation voltage such that the resolver winding goes through one complete revolution for a change in thermal compensation voltage corresponding to a change in thermal error equal to one pole cycle of transformer 33. A potentiometer 272 energized by the power line source 18 has its tap 274 coupled to motor 258 by a fourth linkage 276 to correct suitably the coarse position command signal, for example by adjustment of the total voltage available to potentiometer 14.

The apparatus of FIG. 7 is of course applicable to the embodiment of the invention illustrated in FIG. 1 as well as to that of FIG. 6, only two summing resistors 250 being then required since in FIG. 1 the thermal compensation voltage developed by network 210 is in the form of a single voltage difference existing between tap 216 of that network and ground.

Still another embodiment of the invention is illustrated in FIG. 8. In the embodiment of FIG. 8 potentiometers 170 and 172 are arranged as in the embodiment of FIG. 6 to develop a voltage for energization of the primary winding 300 of a transformer generally indicated at 302. This transformer has two secondary windings 304 and 306, each of which is connected into a bridge circuit similar to that of FIG. 6. In FIG. 8, one bridge circuit, generally indicated at 308, develops a compensation signal representative of the thermal error of the workpiece while the other bridge circuit, generally indicated at 310, develops a compensation signal representative of the thermal error of the machine. The thermal error of the workpiece here means, for a given effective workpiece length, i.e., a given distance between the point of attachment of the workpiece to the machine and carriage location, the thermally induced change in length of that portion of the workpiece undergone upon a change in workpiece temperature between the workpiece ambient temperature and the workpiece design temperature, which is here simply the temperature of its intended use. The thermal error of the machine similarly means the change in length of that portion of the machine bed between the point of attachment of the workpiece thereto and the carriage location occurring upon a change of machine temperature from its ambient temperature to the temperature at which the machine was calibrated.

The embodiment of FIG. 8 thus makes it possible to compensate for errors attributable to separate and independent design temperatures for the machine and workpiece.

If the machine, including transformer 33, was calibrated to be accurate at a temperature $T_1$ while the ambient temperature of the machine and workpiece is $T_2$ and the design temperature of the workpiece is $T_3$, and if the length of the workpiece between its point of attachment and the carriage location is B while the thermal expansion coefficients of the workpiece and machine are $K_W$ and $K_M$, the net correction $\Delta C$ required in the position of the carriage in order that the workpiece as cut shall possess the desired dimensions at $T_3$ is $$\Delta C = B[K_W(T_2-T_3)+K_M(T_2-T_1)]$$

Bridge 308 operates to develop a voltage proportional to the first term on the right in this equation, corresponding to the thermal error of the wokpiece, and bridge 310 develops a voltage proportional to the second term, corresponding to the thermal error of the machine. Accordingly resistors 312 and 314 are temperature sensitive resistors, subjected respectively to the ambient temperatures of the workpiece and machine. While in the usual case the ambient temperature will be the same for both, this is not necessary, $T_2$ being not necessarily the same in the two terms of the equation. Resistors 316 and 318 are adjustable resistors, and potentiometers 320 and 322 connected across the diagonals of their bridges are provided for setting in the thermal expansion coefficients of the workpiece and machine respectively.

The bridges are set up in the same manner as the single bridge of FIG. 6, resistors 316 and 318 being adjusted to bring their respective bridges into balance when resistors 312 and 314 are respectively at the workpiece and machine design temperatures. Separate thermal compensation voltages representative of workpiece thermal error and machine thermal error are taken from the bridges at taps 324 and 326 on potentiometers 320 and 322. They will be of the proper polarities for combination together if the transformer is so wound that the winding ends identified by crosses in the figure are co-phasal.

The thermal compensation voltages at taps 324 and 326 may be combined differentially with each other and with the carriage error signal at summing resistors 328 when small corrections are to be made. The signal so obtained may then be applied to the error amplifier 39 of FIG. 1, after passage, if desired, through an impedance matching amplifier as shown in FIG. 8. Alternatively the thermal compensation voltages may be applied to the circuit of FIG. 7 for larger corrections.

The invention has been described hereinabove in terms of a number of preferred embodiments. It is not however limited to the particular structures and procedures which have been shown and described. The invention is for example applicable to the compensation of thermal errors in the relative positioning of machine elements indexed otherwise than with the help of the position measuring transformers which have been discussed. Consistently with the invention indexing values representative of desired relative positions of the machine elements at other than the ambient machine temperature and with or without further correction for the thermal compensation coefficient of a workpiece referred to the same reference temperature as the machine elements or to a different reference temperature, may alternatively be applied to driving mechanism utilizing other systems of relative position indication. If for example the machine tool is indexed exclusively by means of a data and servo arrangement such as that disclosed in FIG. 1 as the coarse positioning system of that figure including source 18, potentiometer 14, adder 26, amplifier 30 and motor 32, compensation according to the invention may be provided by energizing the network 210 of FIG. 1 or the series combinations of potentiometers 170 and 172 in FIG. 6 or FIG. 8 with the voltage from source 18, to obtain from the compensation network a thermal compensation signal which may be differentially combined with the output of adder 26. Indeed a thermal compensation signal derived according to the invention by taking from a reference voltage a voltage proportional to the separation of specified points on two machine elements and proportional to the difference between the ambient and design temperatures and to the difference in thermal expansion coefficients of the machine elements and workpiece may be employed without any servo system whatever. Such a thermal compensation signal, either electrical or mechanical (the latter obtained from an electrical signal for example by the apparatus of FIG. 8) may be inserted differentially into the drive of the machine elements at some point between the input of the indexing values to the drive mechanism and the output drive elements which actually move the machine elements such as the bed and carriage with respect to each other.

I claim:

1. A method of automatically controlling a machine including two elements movable with respect to each other by drive mechanism in accordance with indexing values supplied to said mechanism to correct the relative positions of said elements to compensate for departures of the temperature thereof from a reference temperature at which the position of one of said elements with respect to a fixed location on the other of said elements corresponds to values indexed to said mechanism, said method comprising the steps of deriving from a reference signal a signal related to the departure of said elements from a given relative position, to the difference between the reference temperature and the actual temperature of said elements, and to the thermal expansion coefficient thereof, and inserting into said drive mechanism a motion varying in magnitude with said last-named signal.

2. A method of automatically controlling a machine having a carriage movable with respect to a bed by drive mechanism in accordance with indexing signals supplied to said mechanism to correct the position of the carriage to compensate for departures of the temperature of the bed from a reference temperature at which carriage motion corresponds to values indexed to said drive mechanism, said method comprising the steps of deriving from a reference signal a first signal related to the separation of the carriage from a given location relative to the bed, deriving from said first signal a second signal related to the difference between the actual bed and reference temperatures and to the thermal expansion coefficient of the bed, and adding said last-named signal to said indexing signals.

3. A method of automatically controlling a machine having a carriage movable with respect to a bed by servo-operated drive mechanism in accordance with indexing signals supplied to said mechanism to correct the position of the carriage to compensate for departures of the temperature of the bed from a reference temperature at which carriage motion corresponds to values indexed to said drive mechanism, said method comprising the steps of deriving from a reference signal a first signal related to the difference between the actual bed and reference temperatures and to the thermal expansion coefficient of the bed, deriving from said first signal a second signal related to the separation of the carriage from a given location relative to the bed, and adding said last-named signal to the error signal in said servo-operated drive mechanism.

4. A method of automatically controlling a machine having a workpiece support and a cutting tool movable with respect to each other by servo-mechanism in accordance with indexing values supplied thereto to compensate for thermal expansion of the workpiece and machine, said method comprising the steps of deriving from a reference signal a signal related to the difference in thermal expansion coefficients of the workpiece and machine, to the difference between the ambient temperature and a reference temperature at which the drive mechanism correctly positions the cutting tool with respect to the workpiece support and to the length of the workpiece between its point of attachment on said support and the point of engagement of the cutting tool therewith, and adding said last-named signal to the error signal in said servo-mechanism.

5. A method of automatically controlling a machine tool having carriage means drivable with respect to bed means on one of which means is supported a workpiece affixed thereto at one part of said workpiece and on the other of which means is supported a cutting tool to correct the drive of said means one with respect to the other for thermal expansion of said workpiece, said method comprising the steps of deriving from a reference signal a signal proportional to the distance between the point of attachment of said workpiece to said one means and the point of engagement of said tool with said workpiece, to the thermal expansion coefficient of the workpiece, and to the difference between the ambient temperature and that at which the workpiece is to be used, and generating a correction to the relative motion of said means in accordance with said last-named signal.

6. A method of automatically controlling a machine tool having a cutting tool supporting carriage movable with respect to a bed on which is supported a workpiece free to expand with respect to the bed in the direction of motion of the carriage to correct the position of the carriage so as to cut the workpiece to possess at a given temperature a given set of dimensions supplied as indexing values to a drive mechanism coupled between the carriage and bed, said method comprising the steps of deriving from a reference voltage a first voltage of amplitude related to the amplitude of the reference voltage according to the length of the workpiece between its point of attachment to the bed and the point of engagement of the cutting tool with the workpiece, deriving from said first voltage a second voltage of amplitude related to that of the first voltage directly with the difference in thermal expansion coefficients of the bed and workpiece and directly with the difference between the ambient and said given temperatures, deriving from said second voltage a motion proportional thereto, and adding said motion to the carriage drive.

7. A method of automatically controlling a machine having a workpiece support and a cutting tool movable with respect to each other by drive mechanism in accordance with indexing values supplied thereto to correct the relative positions of said support and tool to compensate for departures of the machine according to a first thermal expansion coefficient applicable thereto from a first reference temperature at which said relative positions correspond to the indexing values supplied to said drive mechanism and for departures of the workpiece according to a second thermal expansion coefficient applicable thereto from a second reference temperature at which the workpiece is to have the indexed dimensions, said method comprising the steps of deriving from a reference voltage a first voltage proportional to the length of the workpiece between its point of attachment to said support and the point of engagement of said tool with the workpiece, deriving from said first voltage a second voltage proportional to said first coefficient and to the difference between the ambient and said first reference temperatures, deriving from said first voltage a third voltage proportional to said second coefficient and to the difference between the ambient and said second reference temperatures, combining said second and third voltages differentially to produce a fourth voltage and inserting differentially into said drive mechanism a motion proportional to said last-named voltage.

8. An automatic control system for a machine tool including relatively movable machine elements and drive mechanism operatively connected to said elements to shift the same relative to each other, said control system comprising indexing means controlling the operation of said drive mechanism in accordance with indexing signals applied as input data to said indexing means, and means to compensate in the relative positioning of said elements for thermal expansion thereof upon departures thereof from a reference temperature, said last-named means comprising a source of reference electrical signal means to derive from said signal a signal related to the departure in the relative positioning of said elements from a reference relative position, to the linear thermal coefficient of expansion of said elements, and to the difference between the temperature of said elements and said reference temperature, and means to add said last-named signal to said indexing signals.

9. An automatic control system for a machine tool including a bed, a carriage, and drive mechanism operatively connected to shift said bed and carriage relative to each other, said system comprising indexing means controlling the operation of said drive mechanism in accordance with index values applied to said indexing means, a source of reference voltage, a variable resistor connected in series with a potentiometer across said source, said resistor being adjustable in accordance with the thermal expansion coefficient of said bed and in accordance with the difference between the actual temperature of said bed and a reference temperature at which relative motion of said bed and carriage corresponds to said index values, means linking the tap on said potentiometer to the relative motion of said bed and carriage, and means to correct the operation of said drive mechanism in accordance with voltages tapped from said potentiometer.

10. An automatic control system for a machine including one element adapted to support a workpiece, another element adapted to support a cutting tool for engagement with the workpiece upon relative motion of said elements, and drive mechanism for moving said elements with respect to each other, said system comprising indexing means controlling said drive mechanism in accordance with indexing signals applicable as input data to said indexing means, said indexing means being calibrated to produce motion in accordance with said data at a reference temperature, and means to compensate for thermal expansion of said one element, said means comprising a source of reference voltage, means coupled to said cutting tool supporting element to derive from said reference voltage a first voltage proportional to the distance parallel to the direction of motion of said elements between said cutting tool and the point of attachment of said workpiece to said one element, a bridge circuit energized between current terminals by said first voltage, said bridge circuit having in two adjacent arms thereof connected between said current terminals a first temperature sensitive resistor exposed to the same temperature as said one element and a second resistor dimensioned to balance said circuit when said temperature sensitive resistor is at said reference temperature, said second resistor being large in value compared to said first resistor, said bridge circuit further including a resistor connected between the voltage terminals thereof, means to tap from said last-named resistor a voltage proportional to the thermal expansion coefficient of said one element, and means to add said last-named voltage to said indexing signals.

11. An automatic control system for a machine including two relatively movable elements one of which is adapted to support a workpiece and the other of which is adapted to support a cutting tool for engagement with the workpiece upon relative motion of said elements, and drive mechanism for moving said elements with respect to each other, said system comprising indexing means controlling the motion of said drive mechanism in accordance with indexing signals applicable as input data to said indexing means, said drive mechanism and indexing means being calibrated to produce motion in accordance with said data at a reference temperature, and means to compensate for thermal expansion of said one element, said last-named means comprising a source of reference voltage available in opposite polarities, a first potentiometer coupled to said elements and arranged to tap from one of said polarities a voltage proportional to the travel of one of said elements from a zero reference position on the other, a second potentiometer arranged to tap from the other of said polarities a voltage proportional to the distance between the point of affixation of said workpiece to said one machine element and said zero reference, means to take the algebraic sum of the voltages tapped from said potentiometers, a bridge circuit energized by said sum voltage, said bridge circuit having in one arm thereof a temperature sensitive resistor exposed to the same temperature as said elements and in an adjacent arm thereof a resistor dimensioned to balance the bridge when said first resistor is at said reference temperature, said bridge circuit having connected between the junction of said arms and the diagonally opposite junction thereof a potentiometer calibrated in terms of the thermal expansion coefficient of said elements, and means to correct the operation of said drive mechanism in accordance with a signal tapped from said last-named potentiometer.

12. An automatic control system for a machine including two relatively movable machine elements one of which is adapted to support a workpiece and the other of which is adapted to support a cutting tool for engagement with the workpiece upon relative motion of said elements, and drive mechanism for moving said elements with respect to each other, said system comprising indexing means for controlling the motion of said drive mechanism in accordance with indexing values applicable as input data to said indexing means, said indexing means being calibrated to produce motion in accordance with said data at a reference temperature, and means to compensate for thermal expansion of said elements and of said workpiece upon departures thereof from said reference temperature, said last-named means comprising a source of reference voltage, means to derive from said reference voltage a first voltage proportional to the distance parallel to the direction of relative motion of said elements between said cutting tool and the point of attachment of said workpiece to said one element, a bridge circuit energized by said first voltage, said bridge circuit having in one arm thereof a temperature sensitive resistor exposed to the temperature of said elements and in an adjacent arm a resistor dimensioned to balance the bridge when said first resistor is at said reference temperature, said bridge circuit further having connected between the junction of said resistors and the diagonally opposite junction thereof two potentiometers in series, one of said potentiometers being calibrated in terms of thermal expansion coefficients of workpiece materials and the other being set in terms of the thermal expansion coefficient of said elements, means to take the difference of the voltages tapped from said last-named potentiometers, and means to correct the relative motion of said elements in accordance with said difference.

13. An automatic control system for a machine tool including two relatively movable machine elements one of which is adapted to support a workpiece and the other of which is adapted to support a cutting tool for engagement with the workpiece upon relative motion of said elements, said control system comprising a two-member position measuring transformer having one member affixed to one of said elements and the other member affixed to the other of said elements, said one member having a multipolar winding adjacent conductors of which are separated by one-half a pole cycle of known dimension at a reference temperature and the other member of which includes two windings in space quadrature of that pole cycle, whereby upon energization of said quadrature windings with voltages derived from a common source and related as the sine and cosine of a given space phase in said pole cycle the amplitude of the voltage induced in said multipolar winding is a measure of the departure of the relative positions of said elements from a location determined by said space phase, and means to compensate for thermal expansion of said machine elements upon departures thereof from said reference temperature, said last-named means comprising means to generate from said source a voltage related to the distance parallel to the relative motion of said elements between said cutting tool and the point of attachment of said workpiece to said one element, to the thermal expansion coefficient of said elements, and to the difference between the actual temperature of said elements and said reference temperature, and means energized by said last-named voltage to alter said sine and cosine voltages to values related as the sine and cosine respectively of the space phase represented by the sum of said given space phase and the change in said distance occurring with a change in temperature of said elements from said reference to said actual temperatures.

14. An automatic control system for a machine tool including two relatively movable elements one of which is adapted to support a workpiece and the other of which is adapted to support a cutting tool for engagement with the workpiece upon relative motion of said elements, and a two-member position measuring transformer having one member affixed to one of said elements and the other member affixed to the other of said elements, said one member having a multipolar winding adjacent conductors of which are separated by one-half a pole cycle of known dimension at a reference temperature and the other member of which includes two windings in space quadrature of that pole cycle, whereby upon energization of said quadrature windings with voltages derived from a common source and related as the sine and cosine of a given space phase in said pole cycle the amplitude of the voltage induced in said multipolar winding is a measure of the departure of the relative positions of said elements from a location determined by said space phase, and means to compensate for thermal expansion of said machine elements upon departures thereof from said reference temperature, said last-named means comprising means to generate from said source a first voltage related to the distance parallel to the relative motion of said elements between said cutting tool and the point of attachment of said workpiece to said one element, to the thermal expansion coefficient of said elements, and to the difference between the actual temperature of said elements and said reference temperature, means to take the difference between said first voltage and a voltage derived from that induced in said multipolar winding, and means to move said elements with respect to each other in the direction required to reduce the absolute value of said difference, the proportioning of said first voltage being such that a departure in the relative position of said elements from the space phase at which energization of the windings of said quadrature members with said sine and cosine voltages produces zero voltage in said multipolar winding equal to the thermally induced change in the spacing of said cutting tool from said point of attachment occurring with a change in temperature from said reference temperature to said actual temperature will produce in said difference taking means a voltage derived from said multipolar winding equal in magnitude and opposite in polarity to said first voltage.

15. An automatic control system for a machine tool including two relatively movable elements one of which is adapted to support a workpiece and the other of which is adapted to support a cutting tool for engagement with the workpiece upon relative motion of said elements, said control system comprising a two-member position measuring transformer having one member affixed to one of said elements and the other member affixed to the other of said elements, said one member having a multipolar winding adjacent conductors of which are separated by one-half a pole cycle of known dimension at a first reference temperature and the other member of which includes two windings in space quadrature of that pole cycle, whereby upon energization of said quadrature windings with voltages derived from a common source and related as the sine and cosine of a given space phase in said pole cycle the amplitude of the voltage induced in said multipolar winding is a measure of the departure of the relative position of said elements from a location determined by said space phase, and means to compensate for thermal error in the relative positioning of said machine elements upon departure thereof from said first reference temperature and for thermal error in said workpiece upon departure thereof from a second reference temperature, said last-named means comprising means to generate from said source a first voltage related to the distance parallel to the relative motion of said elements between said cutting tool and the point of attachment of said workpiece to said one element, two Wheatstone bridges each including in two adjacent arms thereof portions of a winding inductively coupled with a winding energized by said first voltage, one of said bridges including in a third one of its arms a first temperature sensitive resistor subjected to the actual temperature of said elements and in its fourth arm a resistor proportioned to balance said one bridge when said first temperature sensitive resistor is at said first reference temperature, said second bridge including in a third arm thereof a temperature sensitive resistor subjected to the actual temperature of the workpiece and in its fourth arm a resistor proportioned to balance said second bridge when said second temperature sensitive resistor is at said second reference temperature, means to extract from said first and second bridges respectively unbalance signals proportional to the thermal expansion coefficients of said machine elements and workpiece, means to combine said unbalance signals differentially, means to compare the algebraic sum of said unbalance signals with a voltage derived from said multipolar winding, and means to move said elements with respect to each other in the direction required to reduce the result of said comparison to zero.

16. An automatic control system for a machine tool including two relatively movable elements one of which is adapted to support a workpiece and the other of which is adapted to support a cutting tool for engagement with the workpiece upon relative motion of said elements, said control system comprising a two-member position measuring transformer having one member affixed to one of said elements and the other member affixed to the other of said elements, a source of reference voltage for said transformer, said one member having a multipolar winding adjacent conductors of which are separated by one-half a pole cycle of known dimension at a first reference temperature and the other member of which includes two windings in space quadrature of that pole cycle, whereby upon energization of said quadrature windings with voltages derived from said reference voltage and related as the sine and cosine of a given space phase in said pole cycle the amplitude of the voltage induced in said multipolar winding is a measure of the departure of the relative positions of said elements from a location determined by said space phase, and means to compensate for thermal error in the relative positioning of said machine elements upon departure thereof from a first reference temperature and for thermal error in said workpiece upon departure thereof from a second reference temperature, said last-named means comprising means to generate from said reference voltage a first voltage related to the distance parallel to the relative motion of said elements between the cutting tool and the point of attachment of said workpiece to said one element, two Wheatstone bridges each including in two adjacent arms thereof portions of a winding inductively coupled with a winding energized by said first voltage, one of said bridges including in a third one of its arms a temperature sensitive resistor subjected to the instantaneous temperature of said elements and in its fourth arm a resistor proportioned to balance said one bridge when said first temperature sensitive resistor is at said first reference temperature, said second bridge including in a third arm thereof a temperature sensitive resistor subjected to the instantaneous temperature of the workpiece and in its fourth arm a resistor proportioned to balance said second bridge when said second sensitive temperature resistor is at said second reference temperature, means to extract from said first and second bridges respectively unbalance signals proportional to the thermal expansion coefficients of said machine elements and workpiece, means to combine said unbalance signals differentially, and means to rotate electrically said sine and cosine voltages together in proportion to the algebraic sum of said unbalance signals.

17. An automatic control system for a machine tool including a bed adapted to have a workpiece affixed thereto and a carriage adapted to support a cutting tool for engagement with said workpiece upon relative motion of said bed and carriage, said system comprising a position measuring transformer having a multipolar winding arranged on said bed and quadrature windings arranged on said carriage, the amplitude of the voltage induced in said multipolar winding from either of the said quadrature windings being a substantially sinusoidal function of relative bed-carriage position cyclical in the pole cycle of said multipolar winding, means to develop from a source of reference voltage two cophasal voltages related as the sine and cosine of the space phase in said pole cycle representative of a desired relative bed-carriage position, and means to compensate for thermal expansion of said bed upon change in temperature thereof from a reference temperature at which said multipolar winding is laid down, said last-named means comprising a variable resistor and a potentiometer connected in series across said source, a linkage coupling the tap on said potentiometer to said carriage to draw at said tap a voltage proportional to the distance between the point of attachment of said workpiece to said bed and said carriage, and means to add algebraically the voltage drawn at said tap to an error voltage derived from said multipolar winding, the values of said resistor and potentiometer being so adjusted with reference to the difference between the temperature of said bed and said reference temperature, to the coefficient of linear thermal expansion of said bed, and to the amplitude at the point of said addition of the signal derived from said multipolar winding that a displacement of the carriage from the position at which the sine and cosine voltages applied to said quadrature windings induce zero voltage in said multipolar winding equal to the thermal error in the position of said carriage produced by expansion of said bed between said point of attachment and the location of said carriage will produce at said point of addition a voltage derived from said multipolar winding equal and opposite to that drawn at said potentiometer.

References Cited in the file of this patent
UNITED STATES PATENTS

| | | |
|---|---|---|
| 2,664,787 | Plimmer | Jan. 5, 1954 |
| 2,820,187 | Parsons et al. | Jan. 14, 1958 |

UNITED STATES PATENT OFFICE
CERTIFICATE OF CORRECTION

Patent No. 3,136,218                                                      June 9, 1964

Robert W. Tripp

It is hereby certified that error appears in the above numbered patent requiring correction and that the said Letters Patent should read as corrected below.

Column 3, line 17, for "for" read -- from --; column 8, line 47, for "1261" read -- 1261--; column 9, line 58, for "resistance" read -- resistors --; column 10, line 10, for "sin $\emptyset_1$" read -- sin $\emptyset_0$ --; line 61, for "untit" read -- unit --; column 13, line 51, for "embodiment" read -- embodiments --; column 20, line 38, for "and" read -- said control system comprising --.

Signed and sealed this 3rd day of November 1964.

(SEAL)
Attest:

ERNEST W. SWIDER                                          EDWARD J. BRENNER
Attesting Officer                                             Commissioner of Patents